United States Patent
Schmitt et al.

[11] Patent Number: 5,826,954
[45] Date of Patent: Oct. 27, 1998

[54] METHOD AND APPARATUS FOR CONTROLLING THE BRAKE SYSTEM OF A VEHICLE

[75] Inventors: Johannes Schmitt; Ulrich Goennenwein, both of Deutsch, Germany

[73] Assignee: Robert Bosch GmbH, Stuttgart, Germany

[21] Appl. No.: 736,760

[22] Filed: Oct. 25, 1996

[30] Foreign Application Priority Data

Nov. 8, 1995 [DE] Germany ............... 195 41 601.5

[51] Int. Cl.$^6$ ..................................... B60T 13/00
[52] U.S. Cl. ................ 303/186; 303/113.5; 303/9.62
[58] Field of Search ................... 303/186, 113.5, 303/9.71, 9.62

[56] References Cited

U.S. PATENT DOCUMENTS

| | | | |
|---|---|---|---|
| 4,850,650 | 7/1989 | Eckert et al. | 303/186 |
| 5,251,968 | 10/1993 | Rath | 303/186 |
| 5,281,012 | 1/1994 | Binder et al. | 303/186 |
| 5,320,423 | 6/1994 | Hashida | 303/186 |
| 5,375,919 | 12/1994 | Furuhashi | 303/186 |
| 5,393,131 | 2/1995 | Nomura et al. | 303/186 |
| 5,401,097 | 3/1995 | Schmitt | 303/186 |
| 5,632,535 | 5/1997 | Luckevich et al. | 303/186 |

*Primary Examiner*—Matthew C. Graham
*Attorney, Agent, or Firm*—Fulbright & Jaworski

[57] ABSTRACT

When it is desired to transmit the maximum possible amount of braking force, the braking force at the rear wheels of the vehicle is built up beyond the value predetermined by the braking force distribution and the driver's command, whereas no increase occurs at the front wheels.

12 Claims, 4 Drawing Sheets

METHOD AND APPARATUS FOR CONTROLLING THE BRAKE SYSTEM OF A VEHICLE

BACKGROUND OF THE INVENTION

The invention pertains to a method and an apparatus for controlling the brake system of a vehicle wherein braking force at the rear axle is built up independently of the value specified by the driver and the predetermined distribution.

For stability reasons, the braking force which the driver generates by actuating the brake pedal in conventional brake systems for vehicles is usually distributed to the wheel brakes of the front and rear axles in such as way that the braking force produced at the wheels of the front axle or axles is greater than that produced at the wheels of the rear axle. This braking force distribution is achieved either by mechanical pressure reducers for the rear axle brakes or by electronic adjustment of the braking force of the rear axle brakes. See, for example, U.S. Pat. No. 5,281,012.

Modern brake systems also have an electronic control unit to prevent the wheels from locking during the braking process and to prevent the wheels from spinning when they are being driven. This control unit contains an anti-lock controller (ABS) and an anti-slip controller (ASR).

By means of the predetermined braking force distribution between the front and rear axles, the braking force set by the driver is sufficient in many cases to lock the front wheels but not the rear wheels. Thus the anti-lock controller acts on the front wheels but not on the rear wheels. In some driving situations, e.g., in hazardous situations, it is desirable, with a view to optimizing the braking distance, to take maximum advantage of the transmittable braking force. This is not achieved by the state of the art.

SUMMARY OF THE INVENTION

The object of the invention is to provide measures which optimize the braking distance of a vehicle under maximum utilization of the transmittable braking force without any additional expense.

According to the invention, when it is determined that it is desired to apply a maximum possible braking force at the front and rear axle brakes, the brake force at the rear axle is increased beyond the valve specified by the predetermined distribution and the driver's command.

By means of the measure according to the invention, the maximum transmittable braking force is also utilized at the rear wheels of a vehicle during a braking process, and thus the braking distance of the vehicle is optimized, i.e., decreased.

It is an advantage that this measure is implemented without any additional expense under utilization of the existing components of a brake system, thus allowing the braking force to be built up to a level beyond that specified by the driver, especially a brake system with ABS and ASR functions.

It is an advantage that, at least in selected braking situations (e.g., in hazardous situations), the braking force distribution between the front and rear axles is suspended so that the transmitted braking force can be optimized.

It is a further advantage that the increase in the braking force at the rear axle brakes is brought about when at least one of the front wheels is starting to lock, that is, when the anti-lock controller is acting on at least one of the front wheel brakes, when a panic braking situation is detected, or when the driver wants to brake with an intensity which exceeds a predetermined value.

The use of the invention is advantageous in hydraulic, pneumatic, electrically controlled hydraulic, and electrically controlled pneumatic brake systems and also in brake systems in which the brakes are applied by electric power alone.

DESCRIPTION OF EXEMPLARY EMBODIMENTS

Figure 1:
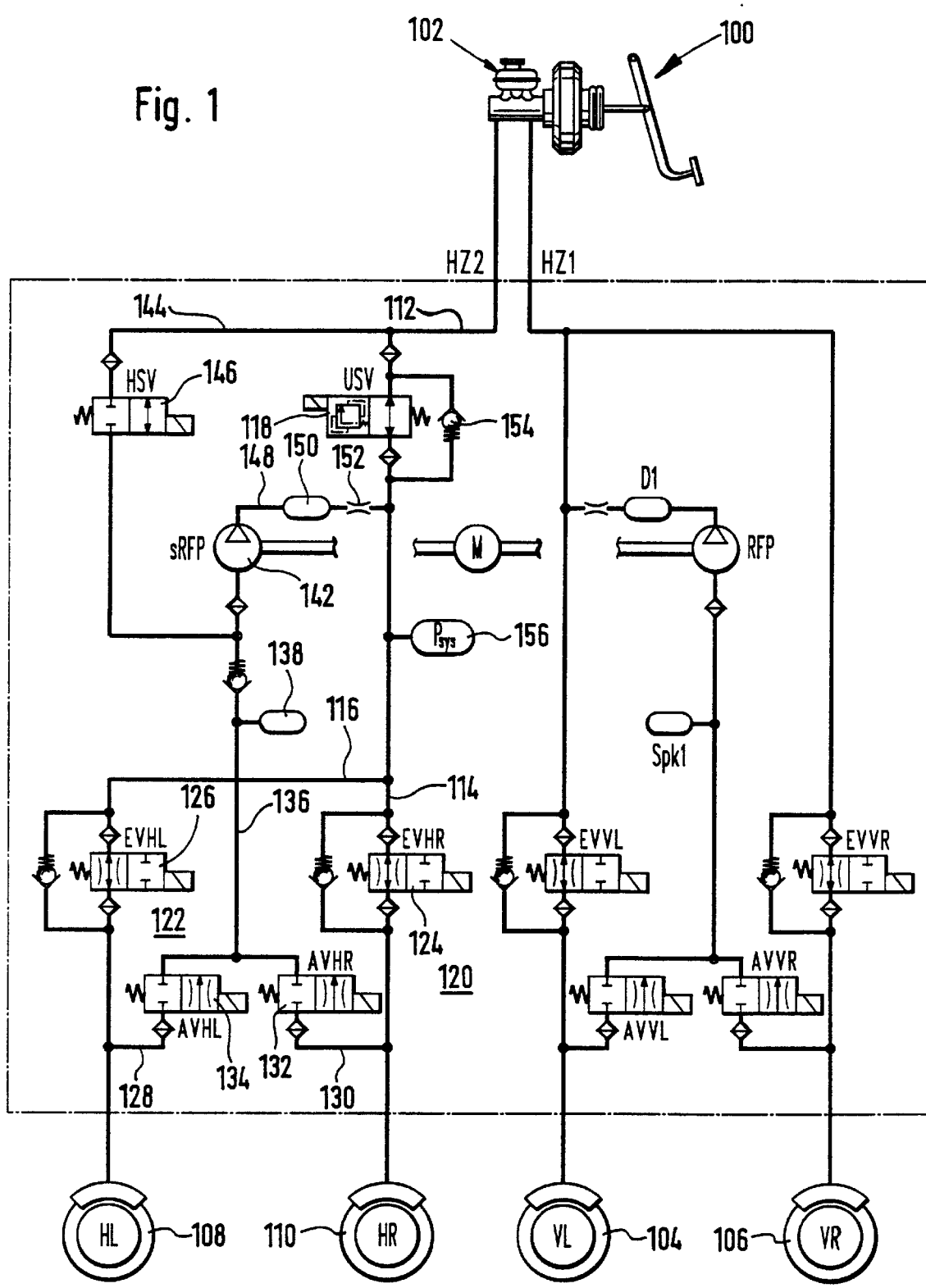
FIG. 1 shows a circuit diagram of a hydraulic brake system with ABS and ASR functions.

FIG. 1 shows a preferred exemplary embodiment of a hydraulic brake system for a rear-wheel-drive vehicle with a first brake circuit HZ1 for the front axle and a second brake circuit HZ2 for the rear axle. The brake system has a pedal-actuated, twin-circuit master brake cylinder 100 with a pressure medium reservoir 102. The first brake circuit HZ1 is connected to wheel brakes 104, 106 of the nondriven wheels of the vehicle; in the exemplary embodiment shown here, these are the front wheels. Wheel brakes 108, 110 of the driven wheels of the vehicle are connected to a second brake circuit HZ2; in the present exemplary embodiment, these are the rear wheels of the vehicle. In the following, the second brake circuit, which is associated with the solution according to the invention, is explained in greater detail. This has a brake line 112, leading from master brake cylinder 100; this line splits into two branch brake lines 114, 116, which lead to wheel brakes 108, 110. A switching valve (USV) 118 with a spring-actuated open position and an electromagnetically switchable closed position is provided in brake line 112. On the wheel brake side, pressure control valve assemblies 120, 122 are provided to modulate the brake pressure in rear wheel brakes 108, 110. Each valve assembly has an inlet valve (EVHL, EVHR) 124, 126 with a spring-actuated open position and an electromagnetically switchable closed position in the corresponding brake line 114, 116 to control the inflow of pressure medium to wheel brakes 108, 110, respectively. Between the inlet valve and the wheel brake, a return line 128, 130 proceeds from the brake line in question. In each return line 128, 130, there is an outlet valve (AVHL, AVHR) 132, 134. The outlet valves have a spring-actuated closed position and an electromagnetically switchable open position. Return lines 128, 130 join to form a single line 136, to which a storage chamber 138 is connected. In addition, the brake circuit also has a high-pressure pump 142, driven by an electric drive motor. The self-priming pump is connected to brake line 112 by an intake line 144 at a point between master brake cylinder 100 and switching valve 118. A high-pressure-resistant switching valve (HSV) 146 with a spring-actuated closed position and an electromagnetically switchable open position is inserted in intake line 144. On the intake side of pump 142, return line 136 is connected to intake line 144. On the delivery side, pump 142 is connected by a transport line 148 to brake line 112 between switching valve 118 and pressure control valve assemblies 120, 122. In transport line 148, a damper chamber 150 and a throttle valve 152 are provided. A pressure-limiting valve 154, furthermore, which bridges switching valve 118 and which, when a response pressure is exceeded while switching valve 118 is closed, opens brake line 112 in the direction of the master brake cylinder, is also provided. In an exemplary embodiment, furthermore, a pressure sensor 156 is provided, which detects the pressure in main brake line 112, i.e., the so-called system pressure.

The first brake circuit is designed in a similar manner. In the illustration according to FIG. 1, the first circuit controls the brakes of the nondriven wheels and thus does not have the components (USV, HSV) required for anti-slip control.

In the case of all-wheel-drive vehicles or in conjunction with a system of vehicle dynamics control, the first brake circuit is designed in the same way as the second brake circuit.

In addition to the braking force distribution shown, the solution according to the invention can also be applied to any other type of braking force distribution (e.g., in a so-called "X-distribution" of the braking force, in which the wheels diagonally opposite each other are combined into one brake circuit).

The preferred embodiment is based on a hydraulic brake system. The advantages of the invention, which makes it possible to increase the rear wheel braking forces beyond the value specified by the driver, can also be achieved with embodiments based on pneumatic, electrically controlled hydraulic, and electrically controlled pneumatic brake systems and also on brake systems with purely electrical brake application.

Figure 2:
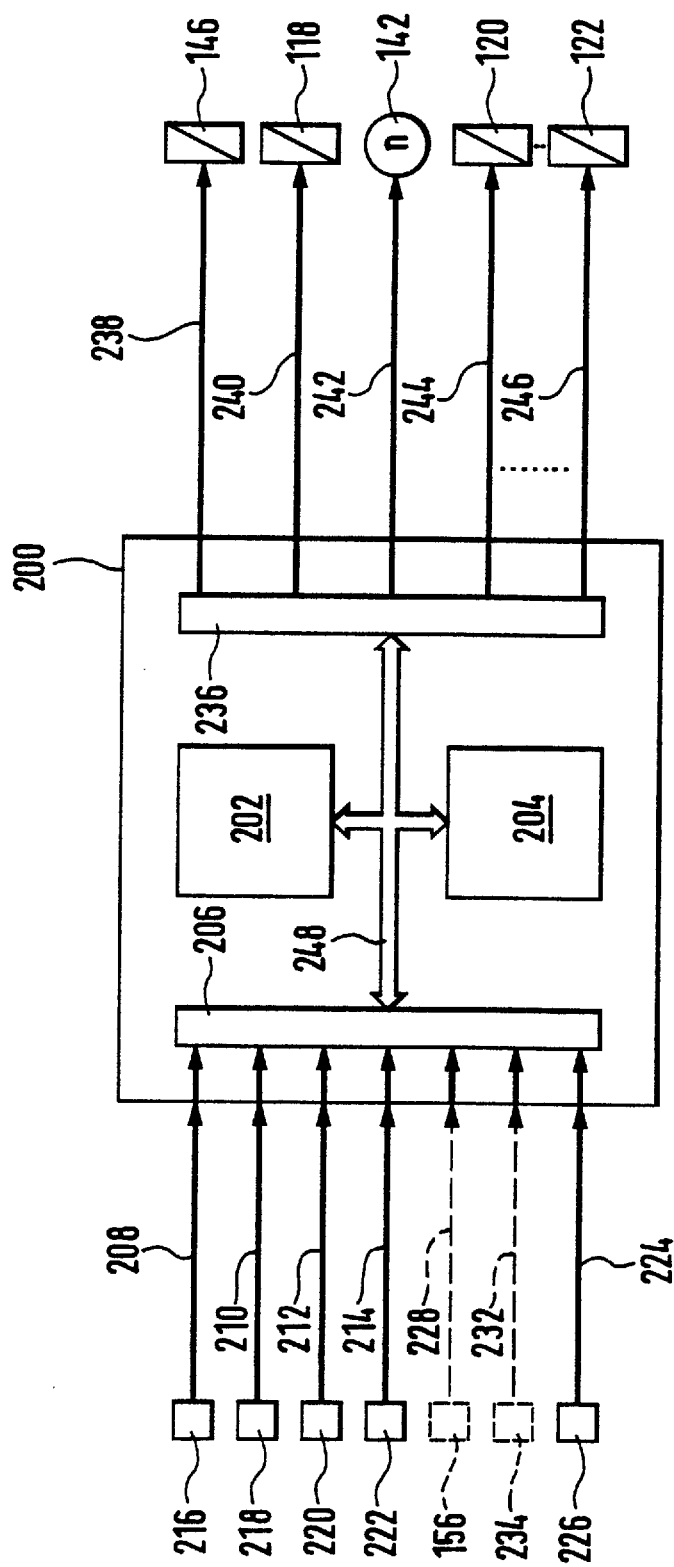
FIG. 2 shows an overall block circuit diagram of the electronic control unit for controlling the brake system.

The control of the brake system illustrated in FIG. 1 is implemented by means of the electronic control unit shown in FIG. 2, which is connected by output lines 238, 240, 242, 244–246 to the actuatable valves 118, 120, 122, 146, etc. and to the pump or pumps 142, etc. In addition, input lines 208, 210, 212, 214 coming at least from measuring devices 216, 218, 220, 222 for detecting the wheel speeds of the vehicle wheels and an input line 224 from a brake pedal switch 226 are also connected to the electronic control unit. In a preferred exemplary embodiment, furthermore, as indicated in FIG. 2 in broken line, an input line 228 from a pressure sensor 156 and an input line 232 from a measuring device 234 for detecting the velocity of the vehicle are also provided.

In the preferred exemplary embodiment, control unit 200 comprises two microcomputers (202, 204), which work through the same control program independently of each other; an input unit 206, to which input lines 208, 210, 212, 214, 224, and possibly 228 and 232 are connected; and an output unit 236, from which output lines 238, 240, 242, and 244–246 proceed. Via output lines 244–246, the valves and pumps of the first brake circuit are actuated. Input unit 206, the two microcomputers 202, 204, and output unit 236 are connected via a communications system 248 for mutual exchange of information and data.

In addition to its use in performing the method according to the invention, the control unit shown in FIG. 2 in the preferred exemplary embodiment also performs anti-slip and anti-lock control functions.

In a manner known in itself, the wheel speeds of the individual wheels are monitored for this purpose. If, during a braking process, at least one of the wheels shows a tendency to lock, the braking force (pressure) at this wheel is reduced as part of the anti-lock control by the actuation of the appropriate valve assembly, of the inlet and/or outlet valve, and the pump, until, on the basis of the wheel speed, it is recognized that the tendency to lock has decreased. Then the outlet valve is closed again; the inlet valve is opened; and thus the pressure is built up again. This control cycle repeats until the tendency to lock has been eliminated or until the braking process is over. The spinning of a drive wheel is also detected on the basis of the wheel speed. Whenever this speed exceeds a predetermined threshold value, switching valve 118 is closed and pump 142 is activated to decrease the speed of the wheel and thus to reduce the tendency of the wheel to spin. By the controlled actuation of switching valve 146, of the inlet valve 124 or 126, and of the outlet valve 132, 134, the brake pressure in the wheel brake assigned to the spinning wheel is modulated so as to reduce the slip. In this situation, the brake pressure built up in the wheel brake is greater than that specified by the driver.

This possibility offered within the scope of the anti-slip control, namely, the possibility of increasing the braking force at a wheel brake beyond the value specified by the driver, is exploited within the scope of the method according to the invention to produce the maximum possible transmittable braking force.

According to the invention, in at least one predetermined braking situation, the braking force transmitted via the rear axle wheels is increased to a value exceeding the driver's command by building up the braking force in the rear axle brakes. This is done in a preferred exemplary embodiment by actuating switching valve 118, pump 142, and high-pressure valve 146. In a preferred exemplary embodiment, the method according to the invention is used whenever it is detected that the pressure has been decreased at one or both of the front wheels, by the ABS. In another embodiment, the method is initiated whenever the vehicle deceleration or the driver's command exceeds a predetermined threshold value. There is also the possibility of using the method according to the invention only in braking situations in which the shortest possible braking distance is desired. These situations can be, for example, panic brakings, in which the driver actuates the brake pedal very quickly and almost completely. The method according to the invention is therefore initiated when it can be recognized that the driver wants the maximum possible braking force to be transmitted and thus wants to achieve the optimum braking distance.

The criteria mentioned above are used both individually and also in any desired combination.

Figure 3:
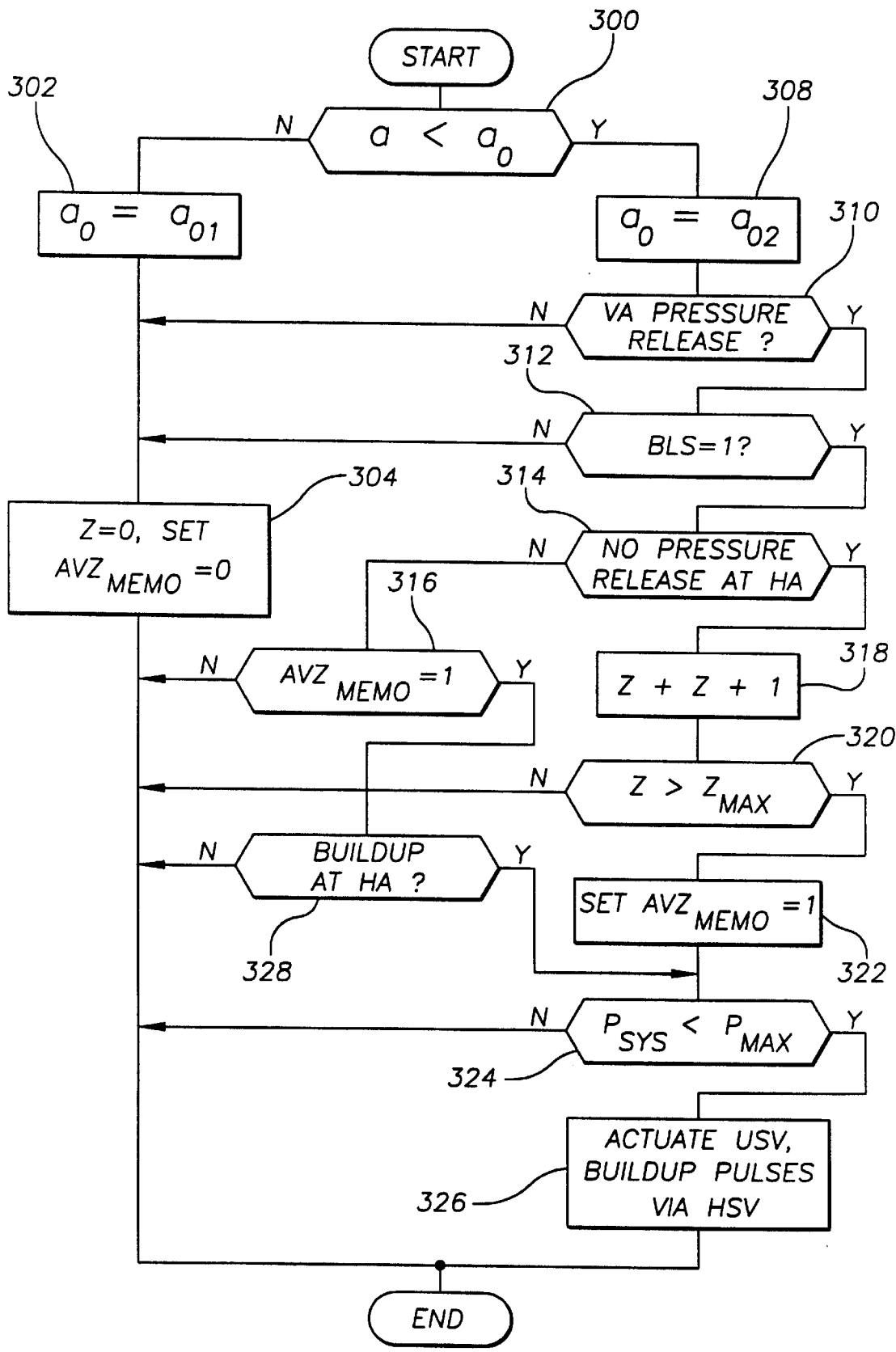
FIG. 3 shows a flow diagram of a realization of the solution according to the invention in the form of a computer program.

A preferred embodiment of the method is illustrated by the flow chart in FIG. 3. This flow chart provides information on the realization of the invention as a computer program running in one of microcomputers 204, 206.

The subprogram shown in FIG. 3 is initiated at predetermined times during a braking process, that is, when the brake pedal switch has been actuated.

The first time the subprogram starts upon the closing of the brake pedal switch, a deceleration threshold value $a_0$ is set to the value "zero". In the following question step 300, the measured actual deceleration of the vehicle is compared with the threshold value $a_0$. To determine the deceleration of the vehicle, the derivative of the vehicle velocity signal with respect to time or the difference between vehicle velocity signals at different times is calculated. The velocity signal itself can be obtained either by means of an appropriate sensor or on the basis of average values of selected wheel speed signals. If the deceleration of the vehicle is not below threshold $a_0$, threshold value $a_0$ is set to a first value $a_{01}$ in step 302. In the preferred exemplary embodiment, this value is $-0.3$ m/s$^2$. If there is therefore no deceleration or if, in the following run of the program, there is only a small amount of deceleration on the basis of the change in the velocity value, then in step 304 a counter Z and a flag $AVZ_{memo}$ are set back to zero. Then the subprogram ends and begins again at the proper time with step 300 when the brake pedal is actuated.

In the next run of the program, the vehicle deceleration which has been determined is compared in step 300 with the threshold value which was set in step 302 (or in step 308 as described further below) to a predetermined value. If the vehicle deceleration is below this threshold value, then in step 308 the threshold is set to a second value $a_{02}$, which is preferably smaller than the value $a_{01}$ set in step 302. In a preferred exemplary embodiment, it has been found advisable to give $a_{02}$ a value of $-0.2$ m/s$^2$. The idea of steps 302 and 308 is to prevent an oscillation around the deceleration value $a_0$. Steps 302 and 308 thus provide a kind of hysteresis. If the deceleration of the vehicle is sufficient, then, after step 308, the program checks in step 310 to see whether the pressure is being or has been released in at least one of the front wheel brakes. This check is done in the preferred exemplary embodiment on the basis of a flag, which is set by the anti-lock controller when the outlet valve AVVL or AVVR at one of the front wheel brakes is actuated to release pressure. With step 310, therefore, the program checks to see whether the ABS case has occurred at one of the front wheels. If this is not the case, counter Z and flag $AVZ_{memo}$ are set to zero in step 304. If a pressure release has occurred at the front axle, then in step 312 the program checks to see whether the brake pedal switch is still closed. This check serves to determine whether the driver is still braking or whether an easing-off on the brake has initiated an actuation of the outlet valve to support the release of pressure at one of the front wheels. If step 312 finds that the brake pedal switch is not closed, the program continues with step 304; if the brake light switch is still closed, the program continues with step 314. In analogy to step 310, the program checks in step 314 to see, on the basis of a flag which is set when an outlet valve on a rear axle brake is actuated, that no pressure has been released in any of the rear axle brakes, that is, to confirm that the rear axle brakes are not being affected by the ABS control. If a pressure release has occurred, the program continues with step 316, otherwise with step 318. If no pressure release has occurred, then in step 318 counter Z is incremented, and in the next step 320 compared with a maximum value $Z_{max}$. If the counter status does not exceed this maximum value, the subprogram ends. If the counter status according to step 320 exceeds the maximum value, then in step 322 the flag $AVZ_{memo}$ is set to a value of 1. Then, in step 324, the system pressure $P_{sys}$ measured in main brake line 112 or obtained on the basis of a pressure model is compared with a maximum value $P_{max}$. If the system pressure is not below the maximum pressure, the subprogram ends. Otherwise, i.e., if the system pressure is below the maximum pressure, then in step 326, the switching valve USV is closed, and the return pump 142 is turned on. Pressure is then built up at the rear axle brakes by actuation of high-pressure switching valve 146 with pulses of predetermined length. The subprogram ends after step 326.

If step 314 has shown that pressure has been released at one or more of the rear wheels, then in step 316 the flag $AVZ_{memo}$ is checked to see whether it has a value of one. If it does not, this means that, in the current phase of braking, a situation which leads to a buildup of the braking force at the rear wheels has still not been recognized, and the subprogram ends. If it does have a value of one, the program checks the setting of a flag in step 328 to see whether there a buildup pulse for increasing the pressure at the rear axle brake has already been transmitted. In this way the program determines whether the pressure decrease recognized in step 314 was possibly the result of the tendency of one of the rear wheels to lock. If no buildup pulse was transmitted, the subprogram ends; otherwise, step 324 is processed next.

The flags mentioned above are not set back until the end of the braking process. This means that, once one of the front wheels has shown a tendency to lock, the braking force is increased at the rear axle. In an advantageous exemplary embodiment, the extent of the increase is reduced or no increase at all is produced if, on the basis of the driver's command, a release or an easing-off of the brake pedal by a predetermined value has been recognized.

In another exemplary embodiment, the flag checked in step 310 is derived directly from the detection of a tendency to lock.

In summary, it can be stated that, as a result of the solution according to the invention, components which can build up the braking force independently of the actuation of the brake pedal are used to increase the braking force at the rear axle brakes to a value beyond that specified by the driver. This is true especially when a situation has been recognized in which it is probable that the driver will want to make optimum use of the transmittable braking force. Situations such as this are recognized, for example, when a decrease in the braking force has occurred at one or more of the front wheels as a result of an intervention by the anti-lock controller; when, after the initial recognition of the decrease, a delay of predetermined length has expired; and when, in the case of a hydraulic or pneumatic system, the pressure in the main brake line (e.g. $P_{sys}$ in line 114) does not exceed a predetermined maximum pressure.

Figure 4A:
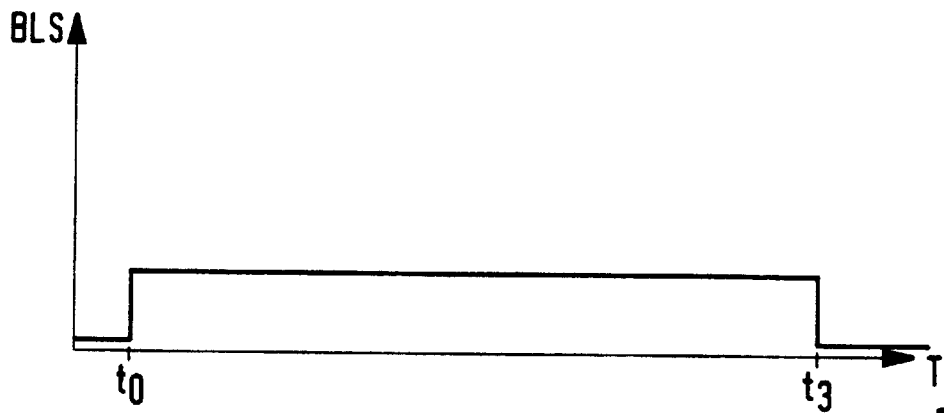
FIGS. 4a, 4b, 4c illustrate the way in which the solution according to the invention operates on the basis of time graphs.
Figure 4B:
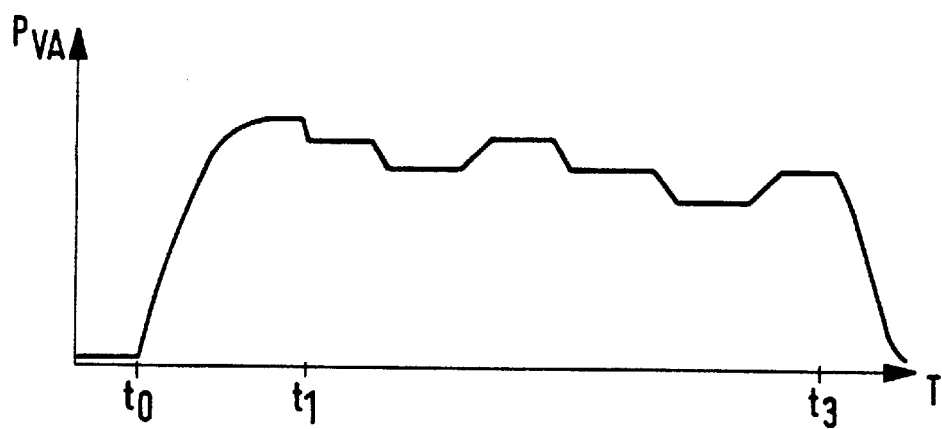
Figure 4C:
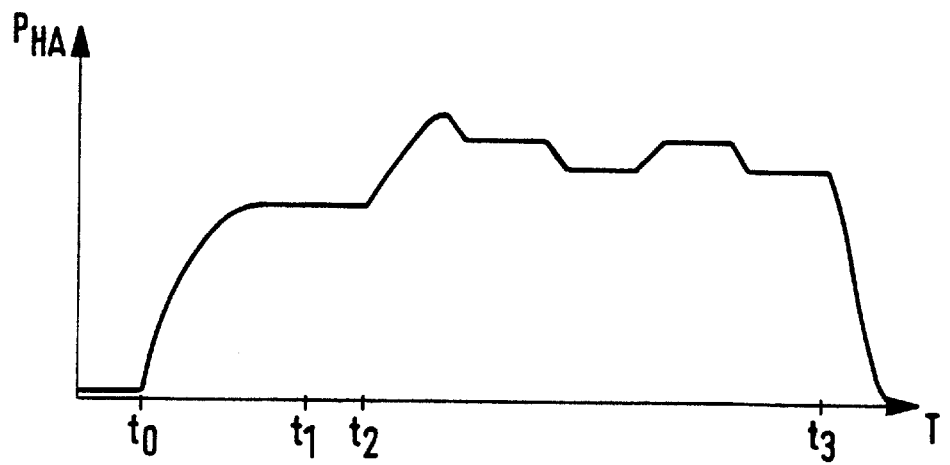

This is illustrated in FIG. 4 on the basis of selected signal patterns of the preferred exemplary embodiment. FIG. 4a shows the change in the actuation of the brake pedal over the course of time; FIG. 4b shows the change in pressure in a selected front wheel brake over the course of time; FIG. 4c shows the change in pressure in a selected rear wheel brake over the course of time. The drive actuates the brake pedal from time $t_0$ until time $t_3$, so that the brake pedal switch changes it state from first open to closed and then from closed to open. At time $t_0$, in accordance with the driver's command and the design of the brake system, pressure is built up both in the front wheel brake and in the rear wheel brake. At time $t_1$, a locking tendency is recognized at the front wheel, so that, starting from time $t_1$, the anti-lock controller intervenes to reduce the pressure. In a corresponding manner, upon expiration of a certain delay after time $t_1$, pressure is built up at the rear axle brake starting at time $t_2$ as described above, until, at a later point, a tendency to lock is also recognized at the rear wheel and the anti-lock controller intervenes. At time $t_3$, the driver lets go of the brake pedal, with the result that the brake pressure in the wheel brakes is decreased in accordance with the driver's command. It is assumed at this point that the vehicle deceleration has exceeded, and the system pressure fallen below, the preset variables.

In addition to the criteria of vehicle deceleration, system pressure, etc., presented above, in another advantageous exemplary embodiment the criterion for increasing the brake pressure in the rear wheel brakes according to the invention is the presence of a so-called panic braking situation, in which the driver actuates the brake pedal very quickly and almost completely.

We claim:

1. Method for controlling the brake system of a vehicle comprising front and rear axles with wheels thereon, front axle brakes, rear axle brakes, and means for translating a driver's braking command into a braking force at the front axle and a braking force at the rear axle according to a predetermined braking force distribution, said method comprising:

determining deceleration of the vehicle, detecting whether at least one wheel on the front axle is exhibiting a locking tendency, specifying a braking force at the rear axle according to the predetermined braking force distribution and the driver's command when the vehicle deceleration is below a predetermined threshold value or when no locking tendency in the front axle wheels is detected, and increasing the braking force at the rear axle independent of the predetermined braking force distribution and the driver's command when the vehicle deceleration is greater than the predetermined threshold value and when a locking tendency is detected in any front axle wheel.

2. Method as in claim 1 wherein said brake system is a hydraulic brake system having a main hydraulic line to said rear axle brakes, and said increasing of said braking force including increasing pressure in said main hydraulic line, said pressure being increased only when said pressure in said main hydraulic line is below a predetermined maximum pressure.

3. Method as in claim 1 wherein said braking force at the rear axle is not increased beyond the specified braking force until a predetermined length of time has elapsed since a locking tendency is detected in any front axle wheel.

4. Method as in claim 1, and further comprising determining when at least one of the rear axle brakes is beginning to lock and discontinuing increasing braking force at the rear axle when at least one of the rear axle brakes is beginning to lock.

5. Method as in claim 1 wherein said brake system is a hydraulic brake system having a main brake line to said rear axle brakes, a controllable valve in said main brake line, and means for generating hydraulic pressure in said line between said valve and said rear axle brakes, said braking force being increased by closing said valve and actuating said pressure generating means.

6. Method as in claim 1 wherein said predetermined threshold value is initially set to a first value, and after said vehicle deceleration falls below said first value, said threshold value is set to a second value which is smaller than said first value.

7. Apparatus for controlling the brake system of a vehicle comprising front and rear axles with wheels thereon, front axle brakes, and rear axle brakes, said apparatus comprising:

means for determining deceleration of the vehicle, means for detecting whether at least one wheel on the front axle is exhibiting a locking tendency, means for specifying a braking force at the rear axle according to the predetermined braking force distribution and the driver's command when the vehicle deceleration is below a predetermined threshold value or when no locking tendency in the front axle wheels is detected, and means for increasing the braking force at the rear axle independent of the predetermined braking force distribution and the driver's command when the vehicle deceleration is greater than the predetermined threshold value and when a locking tendency is detected in any front axle wheel.

8. Apparatus as in claim 7, wherein said brake system is a hydraulic brake system having a main hydraulic line to said rear axle brakes, and said means for increasing said braking force increasing pressure in said main hydraulic line, said pressure being increased only when said pressure in said main hydraulic line is below a predetermined maximum pressure.

9. Apparatus as in claim 7, wherein said braking force at the rear axle is not increased beyond the specified braking force until a predetermined length of time has elapsed since a locking tendency is detected in any front axle wheel.

10. Apparatus as in claim 7, and further comprising means for determining when at least one of the rear axle brakes is beginning to lock and means for discontinuing increasing braking force at the rear axle when at least one of the rear axle brakes is beginning to lock.

11. Apparatus as in claim 7, wherein said brake system is a hydraulic brake system having a main brake line to said rear axle brakes, a controllable valve in said main brake line, and means for generating hydraulic pressure in said line between said valve and said rear axle brakes, said means for increasing said braking force closing said valve and actuating said pressure generating means.

12. Apparatus as in claim 7, wherein said predetermined threshold value is initially set to a first value, and after said vehicle deceleration falls below said first value, said threshold value is set to a second value which is smaller than said first value.

\* \* \* \* \*